NONSCANNING OPTICAL PROCESSOR FOR DISPLAY OF VIDEO SIGNALS

Filed April 9, 1968 4 Sheets-Sheet 1

INVENTORS
MAURO J. DENTINO
EUGENE A. REITZ

BY [signature]

ATTORNEY

NONSCANNING OPTICAL PROCESSOR FOR DISPLAY OF VIDEO SIGNALS

Filed April 9, 1968 4 Sheets-Sheet 2

INVENTORS
MAURO J. DENTINO
EUGENE A. REITZ
BY
[signature]
ATTORNEY

NONSCANNING OPTICAL PROCESSOR FOR DISPLAY OF VIDEO SIGNALS

Filed April 9, 1968 4 Sheets-Sheet 3

INVENTORS
MAURO J. DENTINO
EUGENE A. REITZ
BY
[signature]
ATTORNEY

INVENTORS
MAURO J. DENTINO
EUGENE A. REITZ
BY
ATTORNEY

United States Patent Office 3,545,841

Patented Dec. 8, 1970

3,545,841

NONSCANNING OPTICAL PROCESSOR FOR DISPLAY OF VIDEO SIGNALS

Mauro J. Dentino, Placentia, and Eugene A. Reitz, Tustin, Calif., assignors to North American Rockwell Corporation Filed Apr. 9, 1968, Ser. No. 719,955

Int. Cl. G02f *1/28*

U.S. Cl. 350—161 15 Claims

ABSTRACT OF THE DISCLOSURE

A non-scanning optical processor for display of video signals. A time-domain-to-frequency domain transform device, responsive to the video receiver output of a sample data system, such as for example a pulsed energy system, provides a spectral output having a spectral power distribution, or spectral density function, which is a frequency analog of the time-domain periodic history of the video output. Spatial-frequency light-modulation means, responsive to the spectral output of the transform device, modulates a coherent light beam in a focused optical system, whereby the time-history of the periodic video signal is optically reconstructed in the frequency plane of the optical system.

BACKGROUND OF THE INVENTION

In the display of periodic video information such as the video range-trace signal output of a pulsed energy system, cathode ray tubes have been employed in which an electron beam striking a spot on a phosphor-coating of a viewing glass, causes phosphorescence of such spot. By scanning the beam over a line segment upon the glass and a uniform rate in synchonism with the pulsing of the pulsed energy system, while intensity-modulating the beam with a receiver video output of the pulsed energy system, a range trace signal is displayed by such display indicator.

Such scanning is effected by means of scanning circuits driving beam position control means in response to the system trigger of the pulsed energy system. Calibration means must be included in the scanning circuits to assure coincidence of the electron beam scanning cycle in synchronism with the pulse repetition intervals of the pulsed energy system, in order to provide an accurate range indication. Also, high voltage sources and associated power supplies must be provided for energizing such cathode ray type display indicators. Further, such devices are fragile and subject to damage or breakage in a high *g* vibrational environment or high-impact environment.

Also, such scanned electron-beam type display indicators are limited in the rate at which data may be processed because the electron beam must scan at the system pulse repetition frequency in synchronism with the range time interval of interest. Further, the bandwidth of the display is limited by the time constants of the electromagnetic or electrostatic scanning controls employed.

Also, the brightness range of the image obtainable from the electron beam-excited phosphors of the cathode ray tube is limited, as to repesent a video-amplitude dynamic limitation. Such limited brightness also limits the ambient light level conditions under which such devices may be viewed. Moreover, there are practical limitations of the maximum sizes to which such cathode ray tubes may be built. Such limitations in both size and brightness thus limit the sizes of the viewing audiences which may effectively utilize a single one of such devices.

The limitations on display size and brightness of cathode ray tube devices has been sought to be overcome in the prior art by substitution of elecro-optic devices, in which the scanned electron beam excites an electro-optic material to modulate the polarization of scanned portions thereof (i.e., Pockel's effect), for image modulation of a projected polarized light beam. A description of one such device is included in U.S. Pat. 2,983,824 issued May 9, 1961, to R. W. Weeks, et al., for Electro Optical Point Shutter. Such devices, however, are yet subject to the above-noted disadvantages of scanned electron beam devices. Also, the time-constant of the electro-optic effect limits the rate at which such devices may be scanned. Further, large amounts of heat are dissipated in the generation of the associated preselectively linearly polarized light source. Moreover, the practical manufacture of electron beam tubes employing such electro-optic materials has met with many difficulties due, for example, to outgassing and electron-beam erosion of such electro-optic materials.

SUMMARY OF THE INVENTION

By means of the concept of the subject invention, a solid-state non-scanning optical processor of wide-bandwidth is employed for display of an amplitude-modulated video signal, whereby the disadvantages of cathode ray tubes are avoided and the necessity for and bandwidth limitations of scanning devices are obviated.

In a preferred embodiment of the inventive concept, there is provided a time domain-to-frequency domain transform device, responsive to the amplitude modulated video receiver output of a pulsed energy system. The output of the transform device has a spectral power distribution, or spectral density function, which is an analog (in the frequency domain) of the time-domain periodic history of the video output. Spatial-frequency light-modulation means, comprising a transparent ultrasonic delay line, responsive to the spectral output of the transform device, modulates a coherent light beam in a focused optical system, whereby the time-history of the amplitude-modulation of the periodic video signal is optically reconstructed in the frequency plane of the optical system.

By means of the above arrangement, the spatial frequency components (of the light modulation means) representing the successive portions of the time-domain range trace video, are simultaneously generated for display, whereby scanning modes and the associated data rates and bandwidth limitations of such prior art modes are avoided. Further, the use of fragile, scanned electron-beam devices and associated high-voltage circuits are avoided. Accordingly, it is a broad object of the subject invention to provide an improved display indicator for video signals.

It is another object of the invention to provide a non-scanning optical processor for display of video signals.

It is a further object to provide an optical processor of improved bandwidth for display of video signals.

Still another object is to provide a solid state non-scanning video display indicator having an improved bandwidth.

These and other objects of the invention will become apparent from the following description, taken together with the accompanying drawings, in which:

DESCRIPTION OF THE PREFERRED EMBODIMENTS

Figure 1:
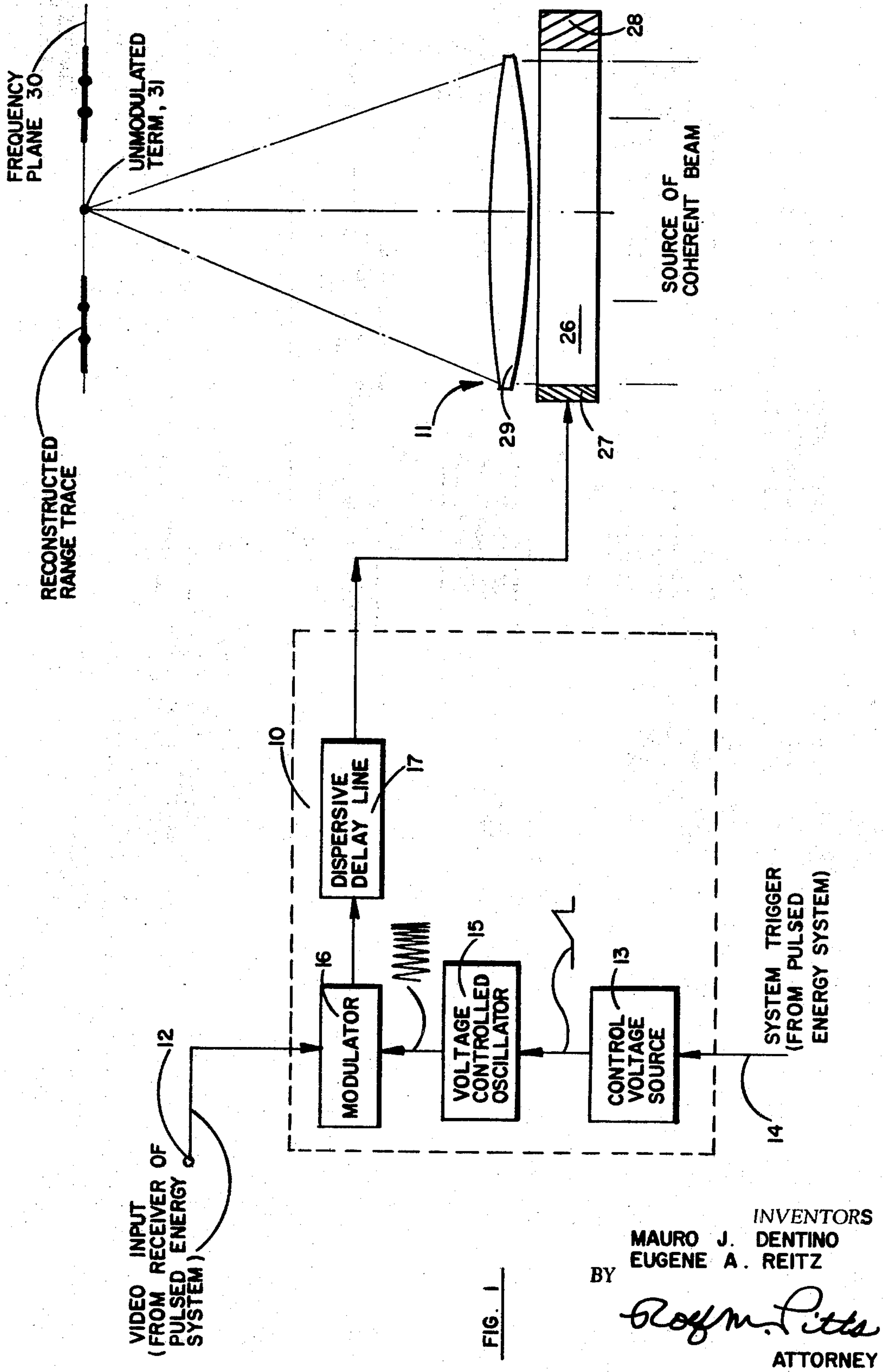
FIG. 1 is a schematic arrangement, partially in block form, of a system embodying the concept of the invention.
Figure 2:
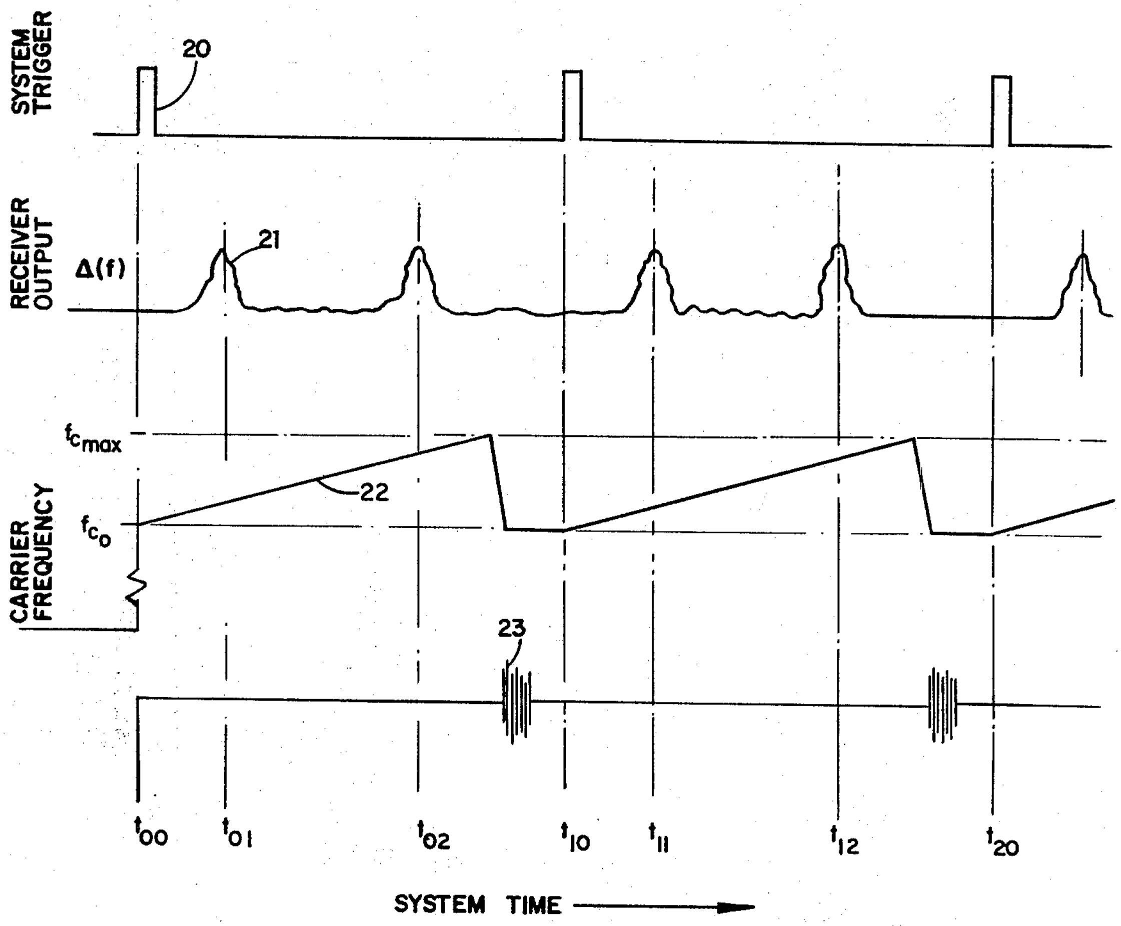
FIG. 2 is a family of time histories, illustrating the inputs to and responses of several components of the system of FIG. 1.

Referring now to FIG. 1, there is illustrated a schematic arrangement, partly in block form, of a system embodying the concept of the invention. There is provided a time domain-to-frequency domain transform device 10, having a video input terminal 12 adapted to be connected to the video output of a receiver (not shown) of a pulsed energy system. Transform device 10 responds to an applied periodic video input, $A(t)$, applied at terminal 12 to provide a spectral output $A(f)$ having a spectral power distribution, or spectral density function, which is a frequency domain analog of the time-domain amplitude modulation history of the applied periodic video input. Such function is achieved by means of a chirped pulse compression system operated in synchronism with the system trigger (curve 20 in FIG. 2) of the utilizing pulsed energy system, the chirping interval of a chirped carrier corresponding to the pulse repetition interval of the utilizing pulsed energy system and the chirped carrier being amplitude modulated by the applied video input on terminal 12.

The structure for such pulse-compression arrangement in FIG. 1 includes a source 13 of a swept voltage or periodic ramp function generator, driven in response to the application on terminal 14 of a system trigger input from the pulsed energy system. The output of generator 14 is employed as a control input to a voltage controlled oscillator 15, producing a swept-frequency or chirped carrier output therefrom (shown as curve 22 in FIG. 2). In other words, the carrier frequency is indicative of range-time. The chirped carrier output of oscillator 15 is amplitude modulated by an amplitude modulator 16 in response to the video input $A(t)$ (shown as curve 21 in FIG. 2) applied on terminal 12, resulting in the spectral power distribution $A(f)$, shown as curve 24 in FIG. 3. In other words, the carrier frequency analog of range time is modulated as to provide a spectral distribution function $A(f)$ which is an analog of the time domain function, $A(t)$.

Figure 3:
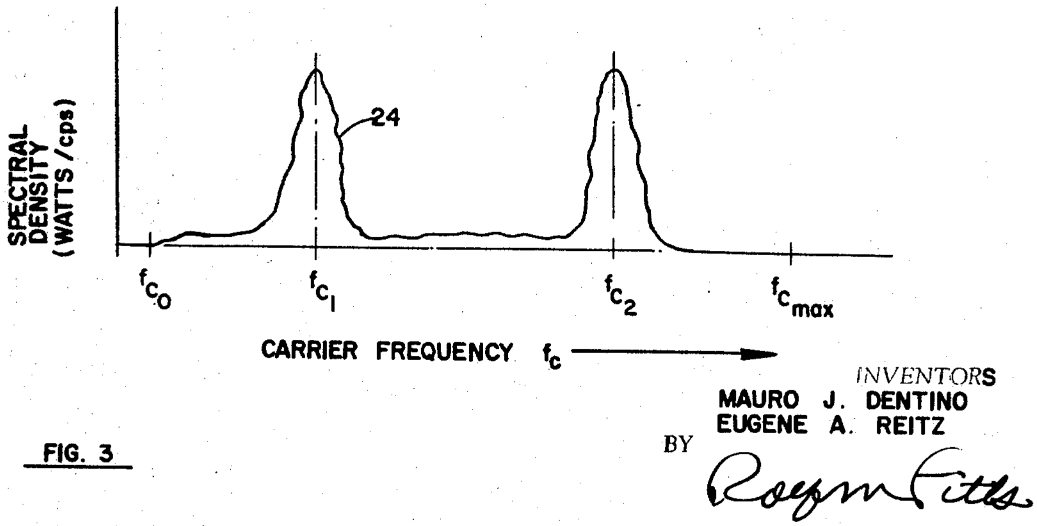
FIG. 3 is a spectral diagram of a representative output of the time domain-to-frequency domain transform device of FIG. 1.

This amplitude-modulated chirped carrier output of modulator 16 is then applied as an input to a matched dispersive delay line 17, matched to the chirped cooperation of oscillator 15 and generator 13. In other words, matched delay line 17 delays the early carrier frequency input thereto, relative to the later carrier frequency, as to provide a pulse-compressed output (shown as curve 23 in FIG. 2) having a spectral density function $A(f)$, corresponding to that illustrated in FIG. 3. The frequencies $f_{c1}$ and $f_{c2}$ at which peak energy densities occur in FIG. 3 are those analog frequencies corresponding to the range times $t_{01}$ and $t_{02}$ in FIG. 2 at which discrete targets or peak amplitude modulations occur in the video range-trace signal illustrated as curve 21.

The compressed output $A(f)$ of matched delay 17 is applied as an input to spatial frequency light modulation means in FIG. 1 for spatial modulation of a collimated coherent light source. Such spatial frequency modulation means comprises a transparent ultrasonic delay line 26, the length of which is oriented transversely of a light beam-to-be-modulated, at one end of which length is a voltage-to-pressure transducer 27 responsively coupled to the output of matched delay 17 and at the other end of which is a terminating acoustic impedance 28. The application of the compressed output of transform means 10 as an input to the transducer 27 for ultrasonic delay line 26 results in a modulation of the refractive index of line 26, which modulation effect is propogated down line 26 as a pressure wave in the form of a set of alternate compressed and dilated portions, the spatial periodicity of which representing a spatial frequency corresponding to the spectral content (or frequencies in the time domain) of the compressed signal input applied thereto. Such pressure wave produces corresponding variations in the refractive index of the delay line 26, resulting in diffractions of and angular deviations in the wavefront of the light emergent therefrom.

The emergent light from line 26 is passed through a focusing lens 29 which focuses the undiffracted or zero order components of the emergent light in a focal plane, for display or recording purposes. Each image position in the focal plane and parallel to the acoustic propagation direction in line 26, corresponds to an associated acoustic modulation frequency, such modulation frequency being indicative of a given range time of the video range trace signal input applied on terminal 12 in FIG. 1, for which reason focal plane 30 is also referred to as the frequency plane. In other words, such focal plane position is indicative of the range-time of the target signal giving rise to an image at such position.

The construction, arrangement and mode of operation of such an ultrasonic light cell or ultrasonic light modulator is understood in the art, as indicated for example in columns 7,8 and 9 of U.S. Pat. No. 3,355,579 issued Nov. 28, 1967, to G. H. Robertson for Correlation Apparatus.

The phenomenon of the diffraction modulation of collimated light in a compressively-variable refractive index medium by means of acoustic or pressure waves propagated transversely of the light beam, is understood in the art, being referred to in the literature as Bragg angle reflection in the utilization of the DeBye-Sears. An explanation of such phenomenon is to be found, for example, in the May 1967 issue of the IEEE publication Spectrum, pages 42–54, in an article "Interaction Between Light and Sound" by Robert Adler.

Figure 4A:
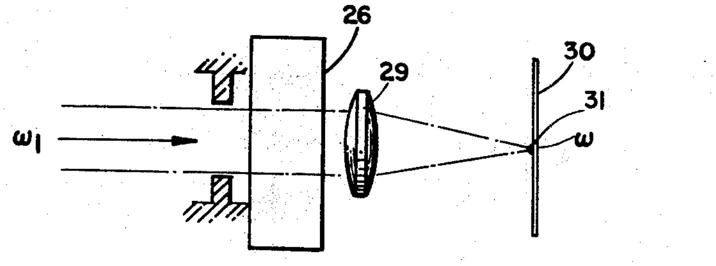
FIGS. 4*a*, 4*b*, 4*c* and 4*d* are schematic arrangements of an exemplary spatial frequency light modulator, illustrating the operating principles thereof.
Figure 4B:
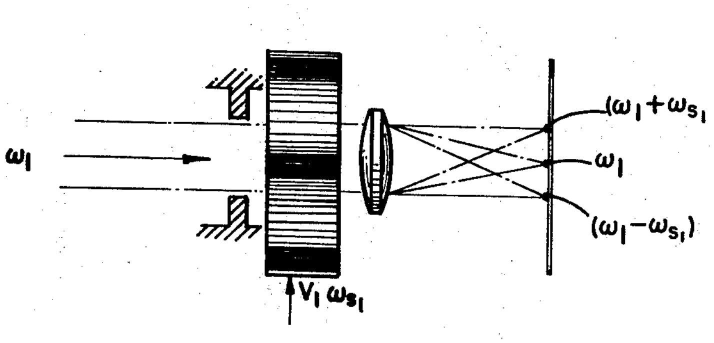
Figure 4C:
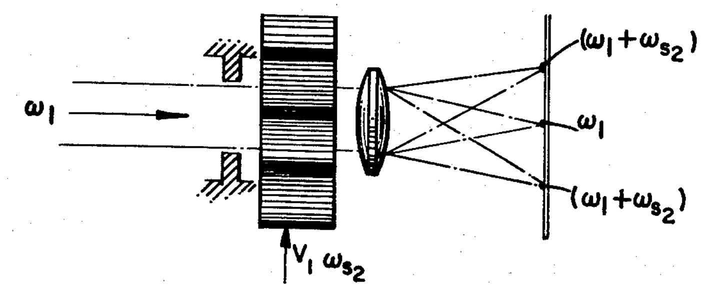
Figure 4D:
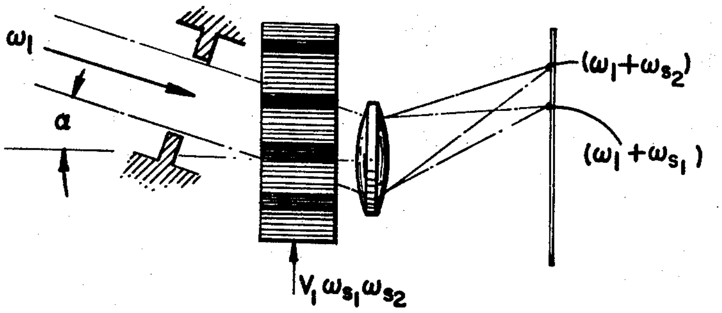

Such phenomenon is briefly explained as follows. Referring to FIG. 4*a*, collimated light having a wavelength $\lambda_1$, representing a carrier frequency $\omega_1$, is projected through a transparent ultrasonic delay line 26 (of an ultrasonic cell) and focused by a focusing lens 29 at a focal spot 31 which may be in the optical center of the focal plane 30 of such lens. Modulation of the refractive index of a compressively-variable refractive-index propagating medium by a transverse acoustic or compressive wave having a wavelength $\lambda_s$, corresponding to an acoustic frequency $\omega_s$, results in a modulated spatial periodicity therein. Such spatial periodicity in the modulated refractive index results in phase-modulation of the carrier light wave wavelength, to provide an upper and lower sideband ($\omega_1 \pm \omega_s$), each having an associated wavefront direction, oppositely deviating from the direction of the carrier lightwave wavefront, as shown in FIG. 4*b*. Increasing the frequency of the modulating acoustic wave ($\omega_{s_2} > \omega_{s_1}$) increases the angular deflection obtained, as shown in FIG. 4*c*. The emergence of the carrier wavefront and an undesired one of the two sideband wavefronts may be prevented by making the delay line light path long enough and adjusting the carrier light incidence angle (at the delay line) to the "Bragg angle" region ($\alpha_{min} < \alpha < \alpha_{max}$) at which such constructive interference effect is achieved, as shown in FIG. 4*d*.

Masking of the emergent beam may be included, if desired, to prevent display of and ambiguity from first and higher order diffraction components of the modulated emergent beam. The brightness or intensity of the display is limited only by the brightness of the collimated light source, as to be adapted for utility under high ambient light conditions. Also, the range-trace data for all ranges are concomitantly injected into the light modulator, whereby no storage time constant analogous to that of a scanned electron beam display indicator is employed. Accordingly, wider display bandwidths result, thereby improving display resolution limits. Moreover, a greater dynamic range of signal levels may be effectively displayed.

Accordingly, there has been described a non-scanning optical processor of video signals. Although the invention has been described in terms of direct display of the deflection angles associated with the zero order diffraction components, the invention is not so limited and mirrors or multiple reflective means may be used for angle multiplication, if desired. Also, other or higher order diffraction components may be used, if desired.

Where the length of the delay line elements corresponds to a plurality of pulse repetition intervals, in the illustrated pulsed energy system application, whereby the spectral distribution functions of at least two pulse repetition intervals are concomitantly present in respective portions of the delay line, then range coherent integration may be effected at the frequency plane.

Figure 5:
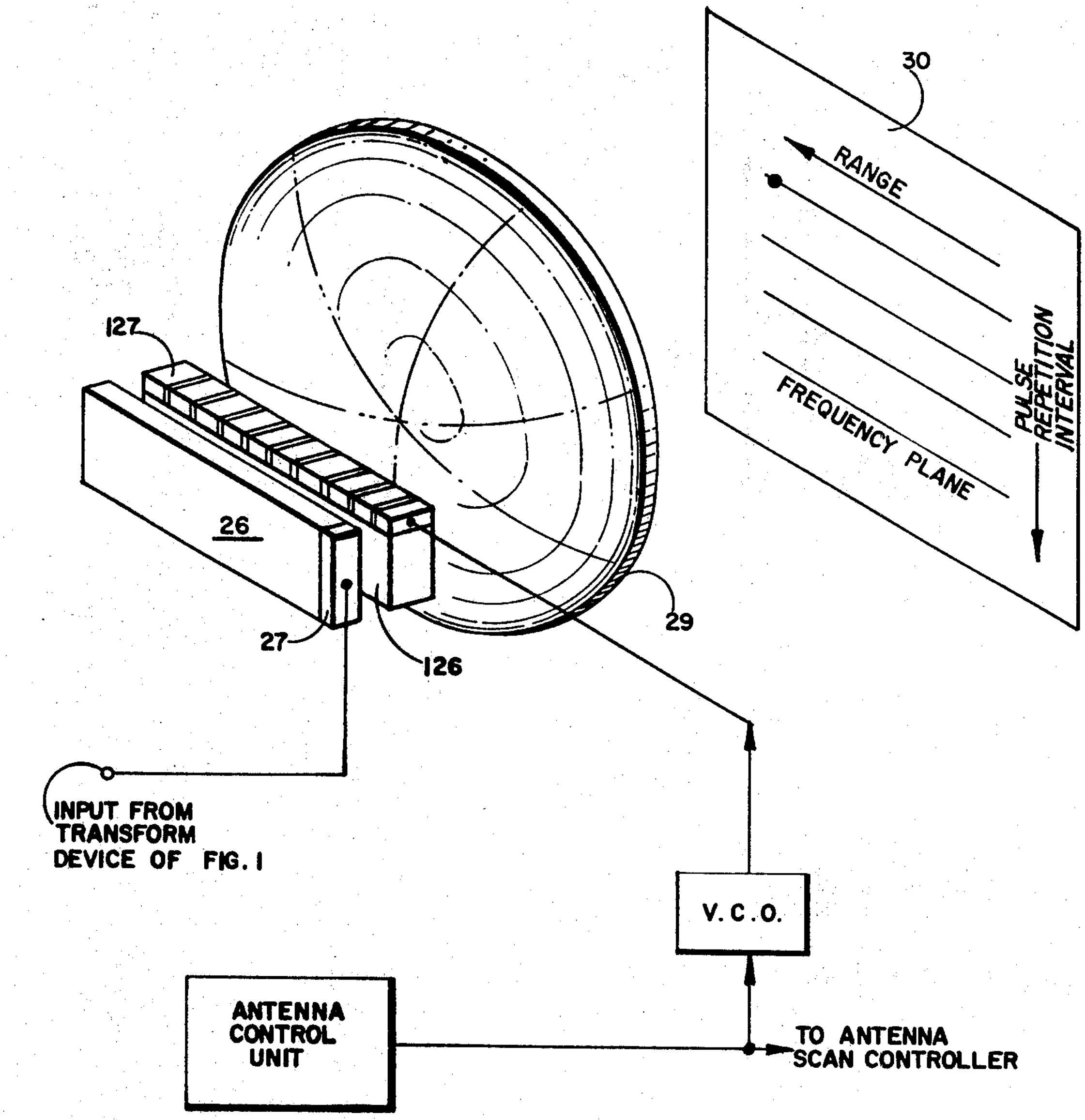
FIG. 5 is a schematic arrangement of another aspect of the invention illustrating dual plane scanning.

Although the invention has been described in terms of displaying a single range trace signal, the scope of the invention is not so limited and successive range trace signals may be successively displayed as a display array by means of an ultrasonic light modulator providing a second spatial frequency modulation crossed relative to both the first spatial frequency modulation and the light beam propagation direction, as shown in the arrangement of FIG. 5. In such arrangement, a second spatial frequency light modulator 126 is interposed in the optical path of the modulated light emergent from the first modulator 26. The second modulator 126 employs a transducer array 127 along a long wall thereof substantially perpendicular to the propagation direction of the collimated beam, for transmitting a pressure wave transversely of such propagation direction. In this way, the modulated light beam or range trace display may be made to move transversely.

By selection of a second modulating frequency equal to the scanning frequency of the azimuthally scanning pulsed energy system, the display can be made to operate in synchronism with such directionally scanning pulsed energy system. Where such system employs a high-speed scanning antenna, such as a frequency-scanned or phase-scanned array, the periodicity of the scanned display can be conveniently made less than, or within, the image retention time factor of human vision, whereby a scanned two dimensional display may be presented.

The speed of response of transducer 127 in FIG. 5 may be improved by reducing the distributed capacitance or R-C time constant presented by the transducer. Such reduced capacitance may be conveniently reduced by cutting or slicing the transducer into an array of separate or discrete smaller elements and connecting them in series circuit. Also, such second transducer may be employed in conjunction with line 26, as to obviate the necessity of second line 126.

Although the device has been illustrated and described in terms of coperation with a pulsed energy system, the concept of the invention is not so limited. It is to be distinctly understood that the concept comprehends cooperation with other types of sample data systems such as, for example, TV receivers for display of TV imagery. Accordingly, an improved optical processor for display of video signals has been described.

Although the invention has been described and illustrated in detail, it is to be clearly understood that the same is by way of illustration and example only and is not to be taken by way of limitation, the spirit and scope of this invention being limited only by the terms of the appended claims.

We claim:

1. A focused optical display device, employing coherent light and having a frequency plane and comprising:

time-to-frequency domain electrical transform means adapted to be responsive to a periodic video input A($t$) for providing a spectral electrical output A($f$) having a spectral power distribution which is a frequency domain analog of the time domain periodic history of said video input; and spatial frequency light modulation means responsive to said spectral output of said transform means for spatial frequency modulation of a coherent light source of said optical device, whereby all portions of said periodic video time history may be optically reconstructed concomitantly in said frequency plane.

2. The device of claim 1 in which said light modulation means comprises an optically transparent ultrasonic delay line for propagating a spatial frequency modulation transversely of a preselected optical path in said delay line.

3. The device of claim 1 in which said light modulation means includes first and second variable optical refractive index means for respectively propagating a respective first spatial frequency transversely of a preselected optical path and a respective second spatial frequency transversely of both said optical path and the propagation of said first spatial frequency.

4. The device of claim 1 in which said time-to-frequency domain electrical transform means comprises a chirped pulse compression system adapted to be operated in synchronism with a sampled data system, the chirping interval of a chirped carrier corresponding to the sampling interval of said sampled data system, said carrier being amplitude modulated by said video input.

5. In cooperation with a sampled data system providing a periodic video output, A($t$), a focused optical display device, employing coherent light and having a frequency plane and comprising:

time-to-frequency domain electrical transform means responsive to the periodic video output A($t$) for providing a spectral electrical output A($f$) having a spectral power distribution which is a frequency domain analog of the time domain periodic history of said video output; and spatial frequency light modulation means responsive to said spectral output of said transform means for spatial frequency modulation of a coherent light source of said optical device, whereby said periodic video time history may be optically reconstructed concomitantly in said frequency plane.

6. The device of claim 5 in which said sample data system comprises a pulsed energy system and in which the aperture provided by said light modulation means corresponds to at least two pulse repetition intervals of said pulsed energy system, whereby range-coherent integration of said video output is performed in said frequency plane.

7. The device of claim 5 in which said light modulation means comprises an optically transparent ultrasonic delay line.

8. The device of claim 5 in which said time-to-frequency domain electrical transform means comprises a chirped pulse compression system operated in synchronism with said sampled data system, the chirping interval of a chirped carrier corresponding to the sampling interval of said sampled data system, said carrier being amplitude modulated by said video output.

9. The device of claim 5 in which said time-to-frequency domain electrical transform means comprises an amplitude-modulated carrier, chirp type pulse compression system operated in synchronism with said sampled data system and having a chirp duration interval corresponding to the sampling interval of said system, an amplitude modulation input of said pulse compression system being responsive to said video output of said sampled system.

10. The device of claim 5 in which said time-to-frequency domain electrical transform means comprises:

a source of a swept-frequency carrier, swept in synchronism with the pulsed operation of said sampled data system and the sweep duration interval of which corresponds to the sampling interval of said sampled data system;

an amplitude modulator coupled to said carrier source and having a modulating input response to said video output for time-domain amplitude modulation of said swept frequency carrier; and a matched dispersive delay line, matched to said swept frequency carrier for providing a time-compressed output.

11. The device of claim 5 in which said spatial frequency light modulation means further includes light modulation means adapted to be responsive to a second modulation frequency for transverse translation of said optically reconstructed video time history.

12. The device of claim 5 in which said spatial frequency light modulation means comprises means for providing a first and second mutually crossed spatial frequency modulation of said light source.

13. The device of claim 5 in which there is further provided second spatial frequency light modulation means responsive to a directional scanning control mode of said pulsed energy system for further modulation of said modulated coherent light source, whereby a substantially two dimensional display is provided.

14. A focused optical display device employing coherent light and having a frequency plane and comprising:

a source of a swept-frequency carrier voltage, an amplitude modulator coupled to said carrier source and having a modulating input response to a video input for time-domain amplitude modulation of said swept frequency carrier voltage;

a matched dispersive delay line, matched to said swept frequency carrier voltage for providing a time-compressed output and coupled to said amplitude modulator; and spatial frequency light modulation means having a first input responsive to said output of said dispersive delay line for optically reconstructing said periodic video time history and a second input adapted to be responsive to a time-varying spectral signal for transverse translation of said optically reconstructed video time history.

15. The device of claim 14 in which said spatial frequency light modulation means comprises means for providing a first and second mutually crossed spatial frequency modulation of said light source.

References Cited

UNITED STATES PATENTS

| | | | |
|---|---|---|---|
| 3,174,044 | 3/1965 | Tien | 350—161X |
| 3,297,876 | 1/1967 | De Maria | 331—94.5X |
| 3,354,456 | 11/1967 | Caputi | 343—17.2 |
| 3,373,380 | 3/1968 | Adler | 332—7.51 |

RONALD L. WIBERT, Primary Examiner

P. K. GODWIN, Assistant Examiner

U.S. Cl. X.R.

178—6.8; 343—6